Figure 1:
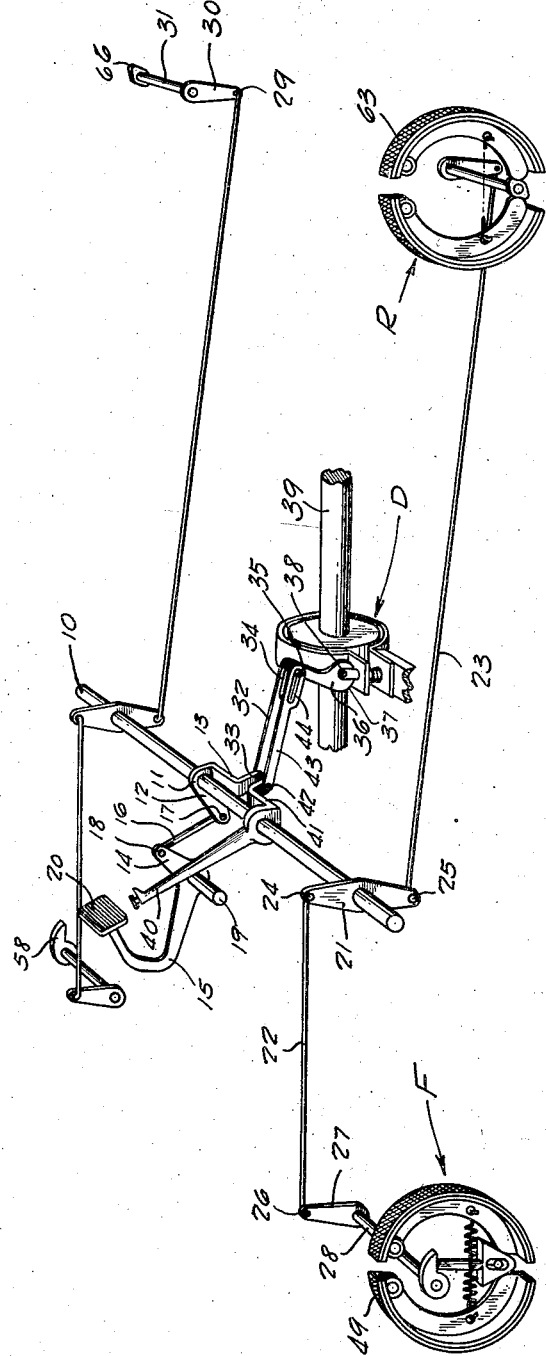

Dec. 13, 1938.　　　　J. M. WHITE　　　　2,140,040
BRAKING SYSTEM
Filed Oct. 24, 1936　　　　2 Sheets-Sheet 1

INVENTOR.
Jesse M. White
BY Joshua R H Potts
ATTORNEY.

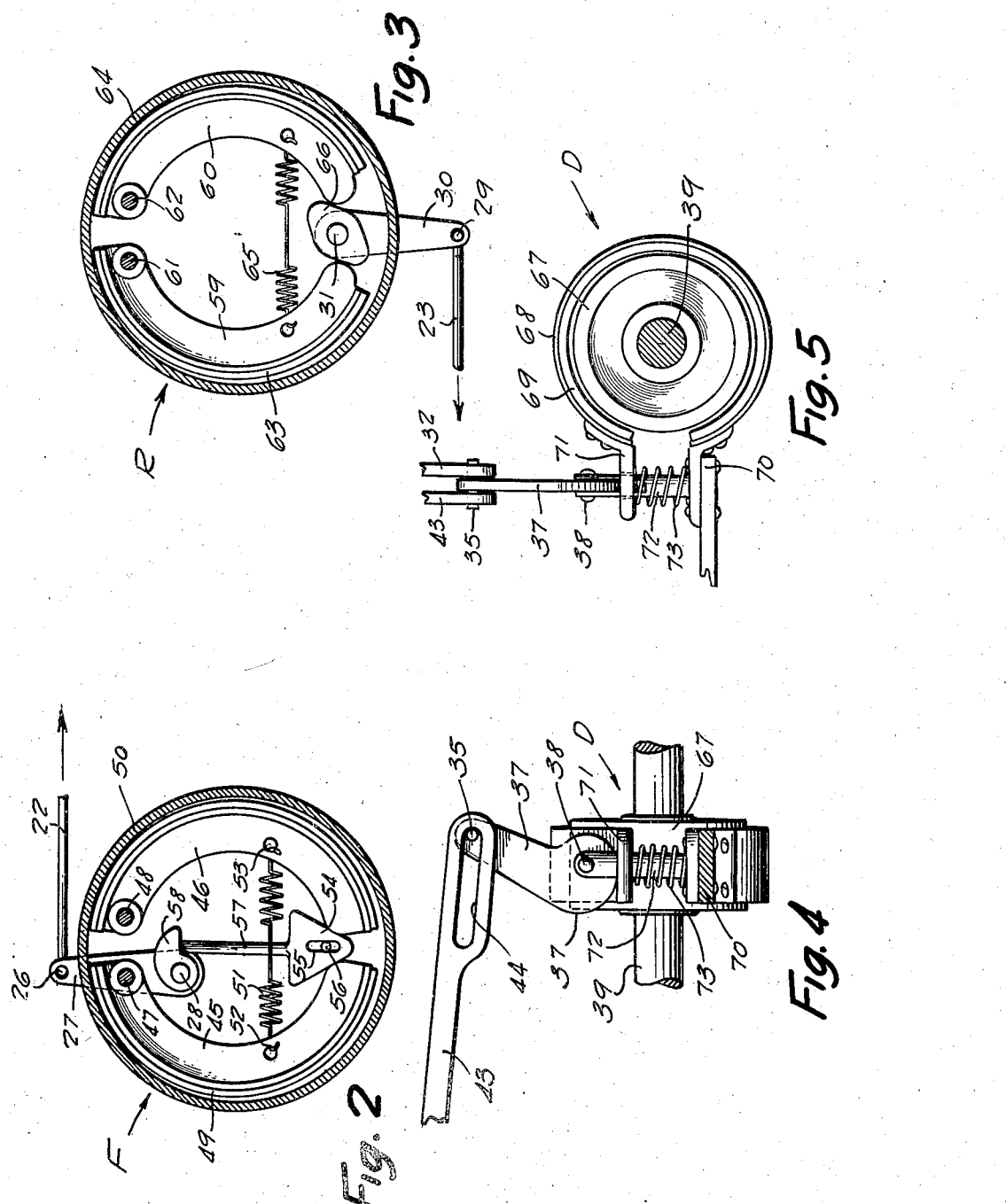

Patented Dec. 13, 1938

2,140,040

UNITED STATES PATENT OFFICE 2,140,040

BRAKING SYSTEM

Jesse M. White, Philadelphia, Pa.

Application October 24, 1936, Serial No. 107,301

1 Claim. (Cl. 188—106)

This invention has to do with braking systems of automotive vehicles, and is concerned primarily with that type of vehicle in which the drive shaft which extends from the source of power to the rear axle is exposed, at least for a portion of its length.

At the present time it is an almost universal practice throughout the automobile industry to employ four-wheel brakes. Such an arrangement involves the location of a brake drum at each wheel, together with suitable instrumentalities for operating the drums from the brake pedal of the car. These connecting instrumentalities may be either mechanical or hydraulic, as both types are meeting with widespread approval. Heretofore it has also been the practice in some automotive vehicles to associate a brake with the drive shaft, which is exposed. Sometimes this brake on the drive shaft has constituted the service brake for the rear wheels, and in other arrangements the emergency brake lever has been connected to this drive shaft brake which is entirely independent of the ordinary service brakes.

With the state of the art as exemplified by the foregoing, this invention has in view as its primary objective the provision of a so-called five point braking system. In this arrangement a brake drum and associated mechanism is located at each of the four wheels of the automobile in the usual manner.

In addition another brake is associated with the drive shaft which extends to the rear wheels. Suitable operating connections connect each of these five brakes with the brake pedal used for normal service purposes, so that upon each operation of this pedal each of the five brakes will be applied. With this arrangement, a highly desirable result is obtained in that the rear wheels of the car are braked directly by the drums located thereat, and also indirectly through the brake on the drive shaft.

It has been found that the application of greater braking effects to the rear wheels of the car, as compared to the front wheels, affords certain advantages which are attained by this arrangement. In addition it is not necessary to apply as much power on the several brakes in order to obtain any desired braking effects, with the result that friction between the brake bands and drums is reduced, with an attendant lengthening of the service life of the brake bands.

Yet another more detailed object of the present invention is the provision of a so-called five point braking system of the character above described, in which an emergency lever is operatively connected to the brake on the drive shaft by connections which render the operation of this brake entirely independent of the operation of the other brakes when the emergency lever is applied.

Conversely when the service brake is operated to apply the five brakes of the car, the emergency lever remains unaffected by this operation.

In carrying out the above noted objects in a practical embodiment, this invention contemplates an arrangement in which the brakes are located at the four wheels of the automobile, following the conventional trend in being of the internal expansion type, while the brake on the drive shaft is of the contracting type.

Various other more detailed objects and advantages which are associated with the carrying out of the above noted objects in a practical embodiment will in part become apparent, and in part be hereinafter stated, as the description of the invention proceeds.

The invention, therefore, comprises a braking system for automobiles which is identified as being of the so-called five point type. This five point braking system includes a brake which is located at each of the four wheels of the vehicle, together with a brake which is mounted on the drive shaft that extends to the rear wheels. Suitable operating connections connect each of these five braking instrumentalities with the brake pedal of the vehicle, while the brake on the drive shaft is connected to the emergency brake lever by connections rendering the operation of the emergency brake lever entirely independent of the operations of the service pedal, and vice versa.

For a full and more complete understanding of the invention, reference may be had to the following description and accompanying drawings, wherein Figure 1 is a view in perspective of a braking system, designed in accordance with the precepts of this invention. In this view only those parts which actually enter into the operation of the braking system are illustrated, Figure 2 is a side view taken as a section through one of the front wheel brakes, while Figure 3 is a similar view taken through one of the rear wheel brakes, Figure 4 is a view in side elevation bringing out the brake assembly which is mounted on the drive shaft, and Figure 5 is a view taken at right angles to the showing of Figure 4. This view is taken as a transverse section through the drive shaft.

Referring now to the drawings, wherein like reference characters denote corresponding parts, a shaft is indicated at 10, and this shaft 10 extends transversely across the chassis of the motor vehicle in which it is journaled for rotation. Drivably carried by the shaft 10 is a bell crank identified at 11, and which bell crank is formed with arms 12 and 13. The arm 12 is connected to a short arm 14 formed integrally with a brake pedal lever 15, the connection being established by a link 16 which is pivotally connected to the arms 12 and 14 respectively, as indicated at 17 and 18. The brake pedal lever 15 is shown as being pivotally mounted on a shaft 19, which is mounted in the chassis of the vehicle.

The brake pedal lever 15 carries a pedal 20 which is engaged by the foot of the operator of the vehicle for the usual brake applying purposes. A spring, not shown, may be associated with this lever to maintain the same in an upraised position. It is evident that depression of the pedal 20 to the connections 15, 14, 16 and 12 causes rotation of the shaft 10. Disposed adjacent to each end of the shaft 10 is a lever 12, each of which is nonrotatably connected to the shaft to maintain the driving relationship.

The lever 21 at each side of the vehicle controls the operation of the front and rear wheel brakes on that side of the car, and as the construction on each side of the car is duplicated, for the purpose of this specification it is only necessary to describe the construction at one side. Accordingly it is noted one of the levers 21 extends both above and below the shaft 10, and at each end are connected the links 22 and 23 respectively; the connection of these links 22 and 23 with the shaft 21 being pivotal, as indicated at 24 and 25.

The shaft 22 extends forwardly where it is pivotally connected at 26 with an arm 27 that is drivably carried by a brake operating shaft 28. This latter shaft extends to a front wheel brake which is referred to in its entirety by the reference character F, and which will be hereinafter described in detail.

The link 23 extends rearwardly of the vehicle to a point where it is connected at 29 with one end of an arm 30, which is nonrotatably carried by a brake operating shaft 31. This shaft 31 is a part of a brake assembly referred to in its entirety by the reference character R, and which will also be hereinafter described in detail.

A link, shown at 32, is pivotally connected, as indicated at 33 with the arm 13 of the bell crank 11, and at its opposite end is formed with a slot 34 in which is received one end of a pin 35 that is carried by an arm 36. The arm 36 is formed at its opposite end with a cam, identified as 37, and which arm and cam are pivotally mounted as indicated at 38 on a brake assembly which is identified in its entirety as D, and which is associated with a drive shaft 39.

An emergency brake lever is indicated at 40, and is shown as being rotatably mounted on the shaft 10. Illustrated as integrally formed with the emergency brake lever 40 is an arm 41, which has pivotally connected thereto, as indicated at 42, a link 43 which is also formed with a slotted extremity, as indicated at 44, and in which slot is received the opposite end of the pin 35.

Referring now more particularly to Figure 2, the construction of one of the front wheel brakes F will now be described. The brake assembly F is shown as comprising a pair of brake shoes 45 and 46, each of which is pivotally mounted, as indicated at 47 and 48 respectively. Each of the shoes 45 and 46 is formed with an exterior substantially semi-cylindrical surface that is covered by a brake lining, shown at 49 in Figure 1. These brake shoes 45 and 46 are disposed within a brake drum 50 that is carried by the front wheel of the vehicle, and the braking effects are obtained by engagement of the lining 49 on the respective shoes with the interior cylindrical surface of the drum 50.

A spring, indicated at 51, is connected at each end with the shoes 45 and 46 respectively, as indicated at 52 and 53, and normally maintains the brake linings 49 out of engagement with the surface 50. A wedge shaped cam member 54 is shown as formed with a slot 55 in which is received a pin 56. The slot and pin 55 and 56 constitute a guide for the cam 54. This cam 54 has its nose positioned between the lower extremities of the shoes 45 and 46, and upon downward movement will spread these shoes to cause engagement of the brake linings 49 with the drum 50. The cam 54 is formed with an extension 57 that engages with a cam member 58 that is drivably mounted on the shaft 28.

It is evident that upon a pull being exerted on the link 22 the arm 27 will be turned to cause rotation of the shaft 28, and which rotation causes a corresponding turning movement of the cam 58. This rotative movement of the cam 58 causes a downward movement of the extension 57 and cam 54 to spread and cause movement of the shoes 45 and 46, and provide the braking effects in an obvious manner.

Referring now more particularly to Figure 3, the construction of one of the rear brakes R is shown as including a pair of brake shoes 59 and 60, which are pivotally mounted, as indicated at 61 and 62 to the chassis of the vehicle. These brake shoes 59 and 60 are provided on their outer surfaces with a brake lining identified at 63 in Figure 1, and which brake lining corresponds to the lining 49 of the front brake F.

The brake shoes 59 and 60 are disposed within a brake drum 64 and are adapted to be operated to have the linings 63 engage the interior cylindrical surface of the drum 64 to apply the braking effects. This drum 64 is carried by the rear wheel of the vehicle.

A spring, shown at 65, exerts a tendency normally maintaining the shoes in a constricted relationship with the linings 63 out of engagement with the drum 64. A cam member is illustrated at 66, and is disposed between the lower extremities of the shoes 59 and 60. This cam member 66 is drivably mounted on the shaft 31, so that upon rotation of the shaft 31 the cam member 66 will be turned to spread the shoes 59 and 60, and obtain the braking effects.

Referring now more particularly to Figures 4 and 5, a drive shaft brake D is illustrated as comprising a brake drum 67 which is keyed to the drive shaft 39. Disposed about the brake drum 67 is a brake band 68 which carries on its interior cylindrical surface a brake lining 69. At one end the brake band 68 is anchored to the chassis of the vehicle, as shown at 70, while the opposite end of the brake band, identified at 71, is in engagement with the cam 37.

A pin is shown at 72 as extending upwardly from the chassis of the vehicle through an opening in the extremity 71, and it is on this pin 72 that the cam 37 is pivotally mounted, as indicated at 38. A spring, shown at 73, normally serves to spread the extremities 70 and 71 apart, and thus maintain the lining 69 out of engagement with the drum 67. However, upon rotation of the arm 36 the cam 37 will be operated to urge the extremity 71 downwardly against the influence of the spring 73, and cause engagement of the band 68 with the drum 67 to provide the braking effects.

It is notable that the drive shaft brake D may be operated either by the service brake pedal 20, which will cause a pull to be exerted on the link 32, or it may be operated by operation of the emergency brake lever 40, which causes a pull on the link 43. When the service brake pedal 20 is operated, the emergency brake lever 40 remains unaffected, due to the pin and slot arrangement 35—34, and conversely when the emergency brake 40 is operated the service brake pedal 20 remains unaffected due to the pin and slot arrangement 34—35.

The operation of the above described mechanism is believed to be obvious. However, it may be briefly described by noting that during the ordinary use of the vehicle on which the system is mounted the pedal 20 will be depressed with the normal service brake operations. Depression of the brake 20 causes rotation of the shaft 10, and rotation of the shaft 10 causes a simultaneous operation of the front wheel brakes F and the rear wheel brakes R on both sides of the car, and at the same time the drive shaft brake D is applied.

If occasion arises the emergency brake lever 40 may be availed of to apply the drive shaft brake D without affecting the brakes at the four wheels.

While a preferred specific embodiment of the invention is hereinbefore set forth, it is to be clearly understood that I am not to be limited to the exact construction illustrated and described, because various modifications of these details may be provided in putting the invention into practice within the purview of the appended claim.

I claim:

In a motor vehicle including two front wheels, two rear wheels and a drive shaft for transmitting power to the two rear wheels, a braking system comprising a brake operatively associated with each of said front and rear wheels, a brake on said drive shaft, a shaft extending transversely across the vehicle intermediate said front and rear wheels, a foot pedal constituting the service pedal of the vehicle, linkage between said foot pedal and said transversely extending shaft whereby depression of the foot pedal causes rotation of said shaft, said linkage extending between said shaft to each of the said brakes on said wheels whereby rotation of said shaft causes application of said brakes, and linkage between said shaft and the brake on the said drive shaft whereby rotation of the transversely extending shaft causes application of the brake on said drive shaft simultaneously with application of the wheel brakes, an emergency brake lever and an operating connection between said emergency brake lever and the said brake on the drive shaft, and which connection is independent of the connection between the foot pedal and the brake on the drive shaft.

JESSE M. WHITE.